US011751521B2

(12) United States Patent
Ciarletti

(10) Patent No.: US 11,751,521 B2
(45) Date of Patent: Sep. 12, 2023

(54) SYSTEM FOR OPTIMIZING USE OF WATER IN IRRIGATION BASED ON PREDICTIVE CALCULATION OF SOIL WATER POTENTIAL

(71) Applicant: SOONAPSE SRL, Rome (IT)

(72) Inventor: Marco Ciarletti, Rome (IT)

(73) Assignee: SOONAPSE SRL, Rome (IT)

( * ) Notice: Subject to any disclaimer, the term of this patent is extended or adjusted under 35 U.S.C. 154(b) by 26 days.

(21) Appl. No.: 17/619,441

(22) PCT Filed: Jun. 18, 2020

(86) PCT No.: PCT/IB2020/055684
§ 371 (c)(1),
(2) Date: Dec. 15, 2021

(87) PCT Pub. No.: WO2020/255000
PCT Pub. Date: Dec. 24, 2020

(65) Prior Publication Data
US 2022/0304262 A1    Sep. 29, 2022

(30) Foreign Application Priority Data
Jun. 21, 2019  (IT) .................. 102019000009735

(51) Int. Cl.
*A01G 25/16*   (2006.01)
*G05B 13/04*   (2006.01)
(52) U.S. Cl.
CPC ........... *A01G 25/16* (2013.01); *G05B 13/048* (2013.01)

(58) Field of Classification Search
CPC ..... A01G 25/16; G05B 13/048; A01B 79/005
See application file for complete search history.

(56) References Cited

U.S. PATENT DOCUMENTS

| 5,870,302 A | 2/1999 | Oliver |
| 2002/0010516 A1 | 1/2002 | Addink et al. |
| 2018/0317407 A1* | 11/2018 | Williams ............. A01G 25/167 |

FOREIGN PATENT DOCUMENTS

| CN | 104521699 A | 4/2015 |
| WO | 2019008570 A1 | 1/2019 |
| WO | 2019118460 A1 | 6/2019 |

OTHER PUBLICATIONS

International Search Report for International Patent Application No. PCT/IB2020/055684, dated Sep. 14, 2020.

* cited by examiner

*Primary Examiner* — Chad G Erdman
(74) *Attorney, Agent, or Firm* — Armstrong Teasdale LLP

(57) ABSTRACT

An irrigation water optimization system based on predictive calculation of water potential of soil through web/cloud is provided. A field data collection system includes a local weather station and a soil data detection device for each area a prediction is to be obtained. Sensors of water potential in the soil detect efforts made by the crop in using available water. A neural network provides the necessary irrigation predictions based on acquired data and evapotranspiration calculated by appropriate equations. Predictions specifically refer to concerned land and allow saving water.

11 Claims, 3 Drawing Sheets

```
<weatherdata>
<location>
<name>London</name>
<type/>
<country>GB</country>
<timezone/>
<location altitude="0" latitude="39.8865" longitude="-83.4403" geobase="geonames" geobaseid="4517009"/>
</location>
<credit/>
<meta>
<lastupdate/>
<calctime>0.0028</calctime>
<nextupdate/>
</meta>
<sun rise="2017-03-03T12:03:03" set="2017-03-03T23:28:37"/>
<forecast>
<time from="2017-03-03T06:00:00" to="2017-03-03T09:00:00">
<symbol number="600" name="light snow" var="13n"/>
<precipitation unit="3h" value="0.0312" type="snow"/>
<windDirection deg="303.004" code="NW" name="West-northwest"/>
<windSpeed mps="2.26" name="Light breeze"/>
<temperature unit="kelvin" value="269.81" min="269.81" max="270.877"/>
<pressure unit="hpa" value="1005.61"/>
<humidity value="92" unit="%"/>
<clouds value="scattered clouds" all="32" unit="%"/>
</time>
...
</forecast>
</weatherdata>
```

FIG. 3

| COMMON NAME |
|---|
| Soja |

| BOTANICAL NAME |
|---|
| Glycine max |

| TYPE |
|---|
| annual |

| CYCLE |
|---|
| early |

| PHENOLOGICAL PHASES | | Kc | CYCLE DURATION (gg) | YEAR'S PERIOD | SWT (Kpa) | DEPTH OF ROOTS SYSTEM (cm) | GUIDING SENSOR |
|---|---|---|---|---|---|---|---|
| initial | sowing-emergence-rooting | 0.4 | 20 | april - may | 30 | 3-4 up to 25 | 1 |
| development | plant growth | 0.7 | 30-35 | may - june | 60 | 25-45 | 1 |
| average | blossoming-pod formation | 1.15 | 60 | june - august | 40-50 | 45-60 | 2 |
| final | ripening-harvesting | 0.5 | 35 | september | 60 | 45-60 | 2 |

| SENSOR INSTALLATION DEPTH (cm) | |
|---|---|
| N°1 | 25 |
| N°2 | 50 |

| SOIL TEMPERATURE AT SOWING | SOWING DEPTH |
|---|---|
| 12°C | 3-4 cm |

FIG. 4

SYSTEM FOR OPTIMIZING USE OF WATER IN IRRIGATION BASED ON PREDICTIVE CALCULATION OF SOIL WATER POTENTIAL

CROSS-REFERENCE TO RELATED APPLICATIONS

This application is a National Stage Application of International Patent Application No. PCT/IB2020/055684, having an International Filing Date of Jun. 18, 2020, which claims the benefit of priority to Italian Patent Application No. 102019000009735, filed Jun. 21, 2019, the entire contents of which are hereby incorporated by reference herein.

FIELD OF THE INVENTION

The present invention relates to a system for optimizing the use of water in irrigation based on the predictive calculation of the soil's water potential.

STATE OF THE ART

FAO data show that 70% of water use worldwide is for irrigation, with peaks of up to 90% in developing countries, further FAO estimates that around 65% of water used for irrigation is wasted.

It is clear therefore that any action aimed at obtaining a significant saving of the water resource (to increase the cultivable areas, to have greater availability for civil or industrial uses, to be able to cultivate more profitable crops that however require more water, etc.) must act on irrigation control technologies, where the margins of recovery of the water resource are enormously greater than in any other sector.

Currently, the irrigation shifts and the quantities of water to be supplied are defined at the beginning of the season, based on the seasonal climatic trends estimated in relation to the average of the last few seasons, but the increasingly pervasive phenomenon of climate change makes these forecasts highly unreliable. The result is that standard quantities of water are used, normally and prudently in large excess, which are even increased if the season is drier than expected.

This trend is now mitigated by the new IoT (Internet of Things) applications of many startups at national and international level, especially based in the USA and Israel. These companies measure the amount of water available in the land, define the water stress thresholds of the specific crops, and when the available water level gets too close to the thresholds they decide (or advise) to irrigate, with a preset standard amount of water. The most advanced ones check the weather forecast, and if a significant precipitation is expected shortly, they delay irrigation.

An example of these more advanced solutions is the solution described in patent document U.S. Pat. No. 5,870, 302A, wherein the opportunity to exploit evapotranspiration (ET) and/or precipitation data to regulate irrigation programs is described. A central computer uses meteorological and ET data to calculate an irrigation factor, which represents the difference between a reference irrigation program and a new irrigation program. The new irrigation program can be based on climatic conditions similar to the geographical conditions in which the irrigation site is located. The irrigation factor is then sent to the irrigation site, which uses the irrigation factor to modify the reference irrigation schedule, if appropriate.

The most widespread AgriTech solutions in the field of Smart Irrigation, often aimed more at "amateur" customers of vegetable gardens, gardens and terraces at home than at professional farms, are effective answers, but only to a certain extent, because they exclusively determine the exact moment in which to irrigate on the basis of the actual and current conditions of the availability of water for the crop, without a "vision" of the future climate trend capable of allowing the development of an optimization strategy over time.

There remains a need to develop these technologies to obtain the following results.

First, it is wished to avoid all the approximations and estimates contained in the classic agronomic formulas. In fact these were defined in periods and contexts in which it was almost impossible to obtain exact and continuous measurements of values such as the water balance of a land, and they compensate this lack with the (valuable but indirect and therefore approximate) experience of agronomists and farmers.

Secondly, there is a need to define a "water behavior model" of each individual soil and crop without applying general formulas, but by learning it directly from the data collected by the soil sensors and building a specific model for each soil, indeed frequently updating it (on average weekly) to follow the trend of the phenological phases of the crop and to grasp "live" the effects of climate change.

Third, a desired result is the development of a predictive engine capable of predicting the water behavior of the soils in the next 5 days (the period in which the weather forecasts are significantly reliable). In fact, irrigation interventions can only be truly optimized if a least medium-term trend is taken into consideration, within which to define the best intervention strategy. Simply stating that "now you need to irrigate" without knowing exactly how that soil will behave with that crop in that phenological phase, does not allow preventive planning of the interventions (with the risk that a last minute accident, such as the breaking of a pipe, endangers the crop), nor the definition of an appropriate "irrigation strategy" (for example, if the rain is expected not tomorrow but in three days, and the crop must be irrigated now, the intervention may include limited water reintegration, waiting to check if the rain will actually fall in the foreseen quantity and on time).

A fourth desired result is that to provide an irrigation indication which, on the basis of the times and the ways in which that specific soil and culture will use water, determines from time to time the correct quantity to use, to avoid any possible waste, bringing the soil to the "field capacity" (the optimal level of water availability for the crop) without reaching its saturation, because all the water exceeding the field capacity level would not be available for the crop anyway and would come therefore wasted, as almost always happens with traditional methods.

Finally, a necessary result is to allow access to the innovative technologies of Agriculture 4.0 also for small and medium-sized farms, intervening already in the design phase with a solution that avoids all possible additional costs for farmers, such as the soil chemical analysis (each coring with relative chemical analysis has huge costs, and it should be done for each field, and it is not realistic to think that these are carried out) or the adoption of local weather stations provided with anemometer (which doubles the cost of the weather station and consumes a lot of electricity, making it necessary to connect to the electricity grid or use much more expensive batteries).

SUMMARY OF THE INVENTION

The object of the present invention is to provide a method and system that, in whole or in part, solves the problems of the prior art and achieves, among others, the results listed above.

The subject-matter of the present invention is a method and a system according to the attached claims.

BRIEF DESCRIPTION OF THE FIGURES

The invention will now be described for illustrative but not limitative purposes, with particular reference to the drawings of the attached figures, in which:

FIG. 3 shows an example of the structure of the weather data as provided by the weather forecast providers;

FIG. 4 shows an example of an agronomic table according to the prior art;

DETAILED DESCRIPTION

Figure 1:
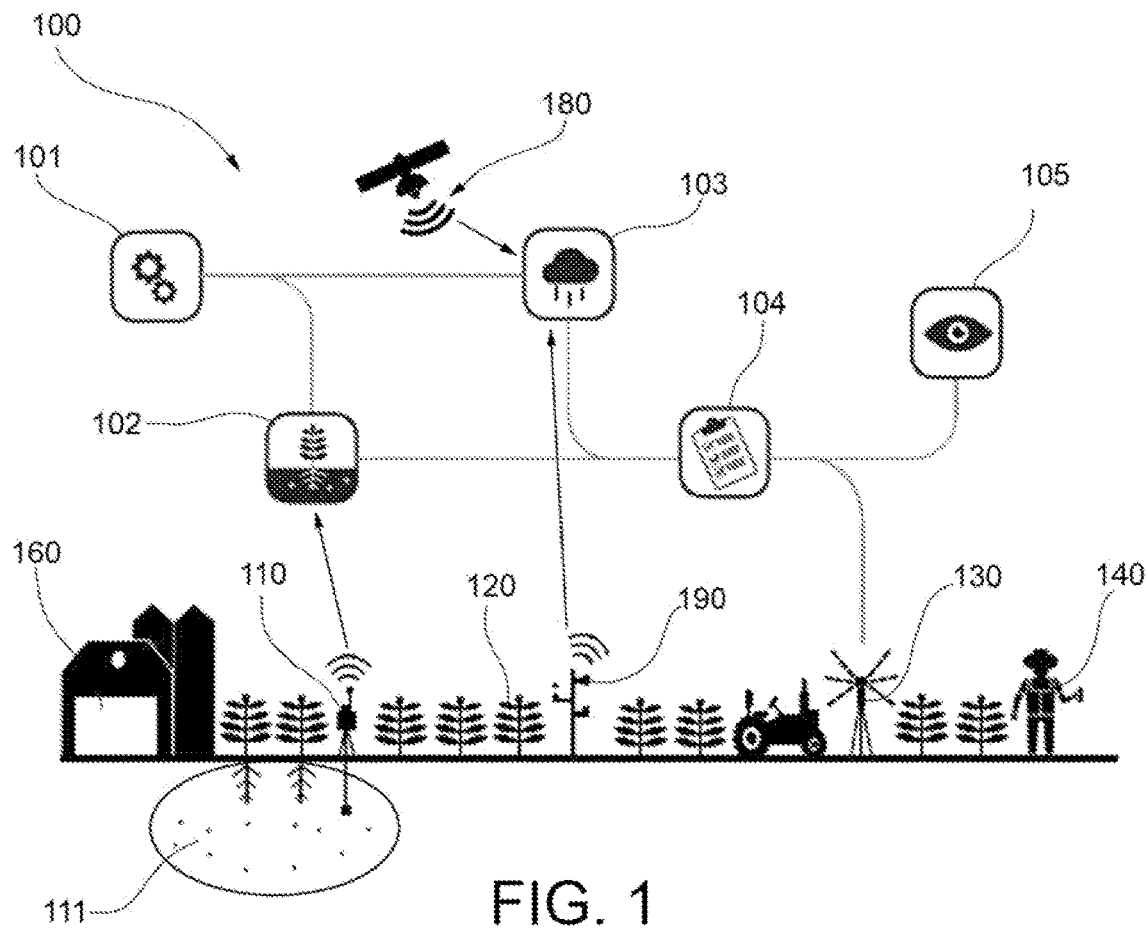
FIG. 1 shows a diagram of an embodiment of the present invention.

It is specified here that elements of different embodiments can be combined together to provide further embodiments without limits respecting the technical concept of the invention, as the average skilled person in the art understands without problems from what has been described.

The present description also refers to the prior art for its implementation, with respect to undescribed detailed characteristics, such as for example elements of lesser importance usually used in the prior art in solutions of the same type.

When an element is introduced, it is always meant that it can be "at least one" or "one or more".

When a list of elements or features is listed in this description, it is understood that the solution according to the invention "comprises" or alternatively "is composed of" such elements.

"Area" means, inter alia, a portion of the earth's surface.

"Default area" means an area that was identified or defined before execution of the method according to this description.

"Expert algorithm" means any algorithm capable of being trained by training data, for example but not exclusively artificial intelligence algorithms such as those of neural networks.

The invention concerns a system for optimizing the use of water in irrigation based on the predictive calculation of the water potential of the soil, in particular in the next 5 days. It is therefore, in general, a web/cloud service for predictive optimization of the use of water in professional irrigation. It is mainly aimed at farms, but in general to anyone who needs to irrigate large areas (e.g. sports fields and golf courses, urban green spaces, villas, etc.), and achieves the objectives listed above with respect to the state of the art.

For this purpose, a field data collection system has been adopted, providing the use of a local weather station (one for each farm, apart from exceptions of lands very distant from each other or located for example on different slopes of a hill) and a device for detecting soil data for each "area" (an "area" corresponds to a field with sufficiently homogeneous soil and with the same crop, definition easily applicable by the skilled person).

Using only these characteristics, we would obtain the trend of the availability of water in the soil, but on the basis of "what has happened", and "what is happening now", while the present method aims to determine, with the best precision possible, "what is about to happen", by addressing the problem of the projection of complex data into the future with Artificial Intelligence technologies, which are the sum of many different factors.

For that purpose, it is advantageous to choose a type of sensor that does not directly detect the amount of water present in the soil (the capacitive type sensors, which return information that is not very useful if not correlated with that of the soil texture) but an index called SWP—Soil Water Potential, which shows the level of "effort" that the crop must make to use the available water, and which is almost totally independent of the type of soil. The SWP is a known index, and is defined as "the amount of work that an infinitesimal amount of water in equilibrium is able to do when it moves (in an isothermal and reversible way) in a pool of water with similar (reference) standards, i.e. similar pressure, elevation, temperature and chemical composition". It should be emphasized that there are alternative definitions of soil water potential using concepts of chemical potential or specific free energy of water of chemical species. This invention works with each of these definitions.

Sensors capable of detecting SWP normally have a measuring range of 0 to 200 cbar/kPa. The scientific literature reports both the value indicating the "field capacity" threshold (definable for example as "the optimal level that allows the crop to make the minimum effort to use the available water"), between 10 and 30 cbar (or kPa), both the values for which the different crops, depending on the phenological phase, approach the "water stress" threshold, defined as the water content threshold with respect to which the crop must make an excessive effort to use the available water and therefore it is necessary to intervene with irrigation.

The data that arrives from the sensors is however a "photograph" of what happens in the field, it shows in a single value the effects of the sum of all the factors that influence the water balance of the soils: rain, irrigation, infiltration, surface and deep runoff, evapotranspiration, surface evaporation, supply of groundwater, soil texture, etc.

A basic result of the system of the present invention is to irrigate when the sensor data indicate an excessive proximity to the water stress threshold. For this purpose, it is sufficient to establish a tolerance margin to have time to act. A higher result of the invention is to predict when this threshold will be approximated days in advance, to define an irrigation strategy that optimizes water use and irrigation costs. In this case the sensor data can be analyzed, broken down and projected into the future.

The methodology described by the present invention to arrive at making predictions of the water behavior of the soil first defines the "time window" of the forecasts.

A fundamental factor for the determination of the soil water behavior is the climatic condition to which the soil and the crop will be exposed, obtainable by reading the weather forecast, as much as possible inherent in the precise location where the soil is located.

All weather forecast providers today settle over a 5-day period, in which the forecasts are declared reliable with percentages ranging from 80/90% (the first day) up to 40/50% (the fifth day). Many providers recently pushed to publish forecasts of up to 15 days, but for now the reliability of the data from the 6th to the 15th day is too low to be considered (ranging from 10% to 30%).

For now, therefore, the system of the present invention acquires reliable weather forecasts, those for 5 days, renouncing to elaborate predictions based on poor or no reliable data, such as those from the 6th to the 15th day or, worse still, those derived from the projection of the weather series data from previous years. The method and the system according to the invention are ready to be used also with a prediction interval of any length.

To obtain the best geolocation of the weather forecast, the system of the invention enters the web/cloud weather service request with the coordinates (Latitude and Longitude) of the terrain, calculated when the user performs the initial configuration of their account.

In an example of implementation carried out in the field, the data structure that the system of the invention obtains from the weather services is a data string (temperature, humidity, pressure, rain, snow, wind speed and direction, etc.) at regular intervals of three hours, for a period of 5 days, for a total of 40 data strings (8 per day for 5 days).

FIG. 1 schematically summarizes an embodiment of the optimized irrigation system 100 of the invention according to the above. In particular, the following are shown in the order: the initial configuration form 101 in which the main reference data are defined, such as the geolocation and extent of the land, the crop applied, the sowing date, the irrigation system, the table with agronomic rules relating to cultivation; the module 102 which includes the sensor devices 110, 190 configured and suitable to detect atmospheric and soil data 111: weather station and soil sensors; module 103 which includes a connection to a telecommunication network for obtaining weather forecasts from a remote central forecasting unit 108; module 104 which has an irrigation strategy planned by module 105 in the previous forecast; a prediction learning and processing module 105 which processes all or part of the information listed above and provides a new prediction on the irrigation behavior of the soil and the crop in a future period of time (for example 5 days), checking against this prediction the congruity of the irrigation strategy already defined and possibly intervening to modify it.

On the basis of this predictive activities, sprinklers 130 of the crop irrigation system 120 are activated through special actuators, or manually by people 140. The reference number 160 indicates a generic farm.

Figure 2:
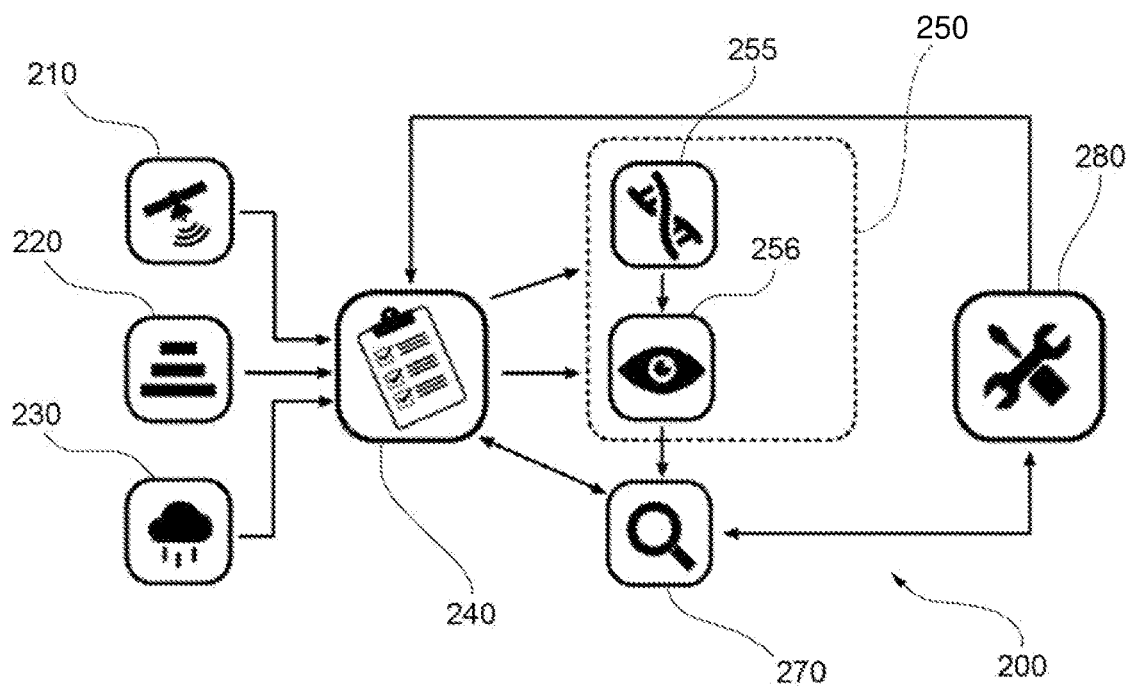
FIG. 2 shows a logical flow diagram of the production and information processing, in an embodiment of the present invention.

FIG. 2 shows a logic flow diagram 200 of the production and processing of information, according to an aspect of the present invention. The incoming data are divided into three categories: structural data 220, which includes the information that defines the context of application (one or more in the group including, not exclusively: geolocation, land extension, applied crop, sowing date, type and characteristics of the irrigation system, table with crop agronomic rules); event data 210 which include real-time information showing the behavior of the ecosystem under control (one or more in the set including, not exclusively: environmental and soil data from the sensor devices, any changes by the user to irrigation plans or to durations of the phenological phases); forecasts 230 that collect geolocated weather forecasts.

All this information is used for "data pre-processing, flow control and scheduling" 240, which verifies the congruity of these data with respect to the values predicted in the last prediction (possibly by refining the control through the "data quality control" function 270) and activates, when necessary, the AI functions 250 which include "predictions generation" 256 (if the prediction of the next 5 days must be updated) and "models generation" 255 (if the basic water behavior model of the soil and crop must be reworked). The results of both these functions are then verified by the "data quality control" function 270, which prepares them for the final passage to the "decisions and actions strategy" module 280, where irrigation times, quantity of water (in general irrigation fluid, for example a mixture of water and other elements) to be dispensed, any notifications and alerts to be communicated to the user and the assistance operator are determined. This last set of information then becomes the reference framework, in the function of "data pre-processing, flow control and scheduling" 240, for the congruence analysis of subsequent incoming data.

FIG. 3 shows an example of the structure of the weather data. The information block highlighted in green is repeated 40 times, each time with the set of forecasts for the next 3 hours, until completion of the forecast for the next 5 days.

Even if the weather forecast, and the consequent prediction of the soil's water behavior lasts 5 days, the system of the invention every day (or other predefined time interval) reads the updated weather forecast, and elaborates the prediction again, modifying, where necessary, the irrigation advice for the user.

To determine the water behavior of the soil in the next 5 days, according to an aspect of the invention, the following steps are carried out.

Data Acquisition

According to an aspect of the invention, the system is equipped with the following hardware in the predetermined area subject to the determination of optimal irrigation:
- at least two water potential sensors installed at least at two respective depths in the soil;
- an irrigation system having a predetermined flow of irrigation fluid;
- a weather station installed in the predetermined area, with environmental data sensors including: a temperature sensor, a humidity sensor and a rain sensor;
- a connection to a remote weather forecast center.

The system also has or may have access to configuration data that include: position and extent of said predetermined area (also called "land" in the jargon), type of said irrigation system and said flow rate of irrigation fluid, type of said crop, date of corresponding sowing; at least one agronomic table including phenological phases of the crop, duration of the phenological phases, as well as, for each phenological phase: average root depths of the crop, water stress threshold, and indication of the sensor whose soil water potential data is to be compared with the water stress threshold.

Additionally, according to an aspect of the present invention, the configuration data includes irrigation system data such as sprinkling and drop.

The system includes a minimum number of two water potential sensors because according to the invention it is important to determine the behavior with respect to the upper and lower root system of the crop. Although the concept of lower and upper root system already exists in literature, (depending on the period, one prevails rather than the other compared to the use of water by the plant), the inventor does not know its use in the context of a dynamic and self-learning irrigation optimization system.

In addition, in the known technique the sensors usually used to measure the properties of the two areas of the root system are capacitive sensors that detect how much water there is at the relative depth and not the effort that the plant is making. Instead, according to the invention, the sensors are specific for the measurement of soil water potential (SWP). The two respective data are always preferably used but in different proportions depending on the time of the year.

Using this hardware, the method of the present invention comprises a series of repeated acquisitions with a first acquisition period that can be for example two weeks with sampling every hour:
- acquiring the soil water potential from said at least two respective sensors;
- acquiring environmental data from said environmental sensors in the weather station; and
- acquiring geolocated—in the position of the weather control unit—weather forecast data from said remote control unit.

The acquisitions are stored on a remote server (not shown in the figures) for processing irrigation instructions, as time series of data. For weather forecasts, for each acquisition the forecasts for the following days are stored. Preferably, all acquisitions are confirmed for a control of the forecast deviations of the model according to the invention.

Where available, information about the irrigations of the entire life span of the crop can be acquired, since the soil was configured, the crop was inserted and the sensors positioned.

The weather forecasts itself are also used in the prior art, but statically, without constant updating and use together with the other mentioned parameters.

According to an aspect of the present invention, data concerning the type of soil can be included in the agronomic table, such as the indication if the soil is clayey, sandy, etc. These data can be used, thanks to the below referred expert algorithm, by the method of the invention to decrease the initial times of the time series. If the information is entered, the predictions will reach the accuracy threshold of 99% in shorter times (between two and three weeks from when the sensors start the detections), otherwise the time will lengthen slightly (about a month), without consequences for the rest of the life of the crop.

Pre-Processing

In the pre-processing phase, the sensor data are contextualized at the correct moment of the phenological phase of the culture through the application of an agronomic table related to the phenological phases spent by the field culture for the calculation of past daily evapotranspiration. In this regard, FIG. 4 shows an example of an agronomic table relating to Soybeans. The table shows a series of information that includes one or more of the following main development parameters of the crop: the typology (annual, multi-annual, perennial, etc.), the type of cycle (perennial, late, etc.), the various phenological phases with the related information (description, Crop Coefficient or Kc, cycle duration and its reference period, SWT—Soil Water Treshold or the water stress threshold, expressed in Kpa—KiloPascal, beyond which the crop is likely to go into water stress, the root mean depth in the phase, the indication of which is the sensor-guide for the control of the threshold in the specific phenological phase, the depths in which to place the soil data collection sensors, the optimal soil temperature for sowing and the sowing depth.

Model Generation

The soil's water behavior can depend on multiple physical, geological, biological and chemical factors, including:
- geographic location;
- morphology and composition of the soil;
- climatic conditions (influenced by climatic changes and possible presence of microclimates);
- type of crop;
- actual phenological phase of the crop.

To respond to the extreme variability of the above mentioned factors, the awareness of having to create a specific model for each terrain and need to use a data driven approach has emerged.

For this purpose, it was chosen to use an expert algorithm, obtaining important results.

However, some expert algorithms were more suitable than others for the specific application. For example, algorithms such as deep-learning algorithms are particularly exposed to phenomena such as overfitting and underfitting and require a wide choice of hyper-parameters (they are the parameters, in a machine learning model, which are not determined through the learning or training-phase procedure; examples of hyper-parameters used in the invention are the number of previous days to consider rain as input, or whether to use ETO—potential or reference evapotranspiration—as input or ETC—effective or crop evapotranspiration) and a consequent intense cross-validation activity, difficult to automate, to adequately select these parameters in order to avoid the aforementioned phenomena. There is also the problem of obtaining results that are adequate to the objectives in the shortest possible time elapsed from the start of relevant field data collection, therefore having a reduced data set available to carry the model-learning phase. Due to these constraints, it was decided to focus attention on less "deep" models, opting specifically for the "Random Forest", machine learning models, for the following reasons:
- they are particularly resistant to the overfitting phenomenon;
- they achieve high accuracy even with a reduced training set;
- their lack of hyper-parameters to be adjusted allows for an excellent adaptability to different training-sets.

According to the invention, however, other techniques can also be used, according to their evolution as well as the evolution of the speed of computers. In general, any expert algorithm can be used.

Using the above mentioned pre-processed data, a model representing the soil's water behavior is generated through an automatic learning approach. This representation takes concrete form for example through an ensemble of Random Forest regressors (as mentioned above, the most suitable Artificial Intelligence technology for small datasets; the use of deep learning models is always possible, but less effective as long as the data population of the dataset does not cover periods of many months, e.g. for multi-year crops), organized as a sequence of groups of regressors: a group for each instant of future time to predict the water potential values, each of which consists of as many regressors as there are sensors in the ground. Each of these receives the following quantities as input:
- the latest acquired SWP soil water potential values available (one series for each sensor at a different depth, for example in the last 7 days);
- the amount of rainwater added to the irrigation water of the last twenty four hours and the previous twenty four, or for other predefined time intervals;

the amount of rainwater provided by the meteorological services for each time interval corresponding to the previous regressors systems (indicatively, each interval can be three hours, especially at the intervals with which the providers provide the weather forecast);

the expected water consumption of the crop through the calculated daily crop evapotranspiration values, starting from the moment the prediction is started, by applying the Penman-Monteith equations (the official FAO scientific reference, see http://www.fao.org/2/X0490E/x0490e06.htm) which uses the temperature data and the wind data, or Hargreaves (see e.g. http://onlinecalc.sdsu.edu/onlonghargreaves.pdf) which uses only the temperature data.

Regarding the Penman-Monteith equation, the wind speed and direction data are taken from the weather station. The use of these data and the Penman-Monteith equation is not mandatory, because the invention has special features to prevent the user from being forced to purchase a weather station with anemometer, much more expensive and requiring additional power (mains or with more robust battery and solar panel). However, if the user also purchases the anemometer, the accuracy of the predictions of the invention can further improve by a few tenths of a percentage point.

Below is an example of the calculation of evapotranspiration carried out based on the same input data, to which the two formulas have been applied.

Note the difference of a few tenths in the calculated evapotranspiration values.

Evapotraspiration Calculation
Date: 17 Jun. 2019
Location: Villasor, (CA) Italy

| INPUTS | Penman-Monteith eq. | Hargreaves eq. |
|---|---|---|
| Average temperature: 20.56 (° C.) | | |
| Maximum temperature: 26.34 (° C.) | | |
| Minimum temperature: 15.5 (° C.) | | |
| Air humidity: 70.63 (%) | | |
| Maximum humidity: 89 (%) | 4.43 | 4.96 |
| Minimum humidity: 44 (%) | | |
| Air pressure: 101.52 (kPA) | | |
| Wind speed: 1.84 (m/s) | | |

Prediction Generation

According to an aspect of the invention, the system reads the actual soil sensor data, the weather station data, the weather forecast data and the irrigation data, performs the pre-processing phase and applies the results to the generated model (see previous paragraph Model generation); it is thus determined the predictive curve of the water behavior of the soil in the next 5 days (or other predefined time interval), at 3 hour intervals (or other predefined sampling interval), that takes care of the weather forecasts and the water model of the soil in the presence of that particular crop.

As an example, the predictions table produced by the system at 5.00 pm on 23 Apr. 2019 is shown below. With SWP1 and SWP2 we refer to the (prediction and subsequently also real) data of Soil Water Potential relating to the 2 sensors in the field, positioned in this case (asparagus culture) respectively at 30 and 80 cm of depth. The depths at which the sensors are positioned vary for each crop, and are indicated in the agronomic tables designed for the invention (see for example in FIG. 4 the depths at which the sensors for Soybean cultivation are to be positioned).

| | SWP1 | | | SWP2 | | |
|---|---|---|---|---|---|---|
| DAY/HOUR | Prediction | Sensor data | % of precision | Prediction | Sensor data | % of precision |
| 23/04/19 18:00 | 11.28 | | | 0.23 | | |
| 23/04/19 21:00 | 11.65 | | | 0.72 | | |
| 24/04/19 00:00 | 12.70 | | | 0.73 | | |
| 24/04/19 03:00 | 12.64 | | | 0.70 | | |
| 24/04/19 06:00 | 13.12 | | | 0.62 | | |
| 24/04/19 09:00 | 13.08 | | | 0.55 | | |
| 24/04/19 12:00 | 12.36 | | | 0.33 | | |
| 24/04/19 15:00 | 12.35 | | | 0.33 | | |
| 24/04/19 18:00 | 12.54 | | | 0.29 | | |
| 24/04/19 21:00 | 13.34 | | | 0.57 | | |
| 25/04/19 00:00 | 13.13 | | | 0.65 | | |
| 25/04/19 03:00 | 12.64 | | | 0.55 | | |
| 25/04/19 06:00 | 14.15 | | | 0.44 | | |
| 25/04/19 09:00 | 14.30 | | | 0.33 | | |
| 25/04/19 12:00 | 12.93 | | | 0.37 | | |
| 25/04/19 15:00 | 12.99 | | | 0.49 | | |
| 25/04/19 18:00 | 13.83 | | | 0.44 | | |
| 25/04/19 21:00 | 14.02 | | | 0.62 | | |
| 26/04/19 00:00 | 13.22 | | | 0.65 | | |
| 26/04/19 03:00 | 14.46 | | | 0.53 | | |
| 26/04/19 06:00 | 14.50 | | | 0.44 | | |
| 26/04/19 09:00 | 13.96 | | | 0.34 | | |
| 26/04/19 12:00 | 12.82 | | | 0.36 | | |
| 26/04/19 15:00 | 13.62 | | | 0.21 | | |
| 26/04/19 18:00 | 14.06 | | | 0.36 | | |
| 26/04/19 21:00 | 13.32 | | | 0.52 | | |
| 27/04/19 00:00 | 14.66 | | | 0.76 | | |
| 27/04/19 03:00 | 14.82 | | | 0.76 | | |
| 27/04/19 06:00 | 14.85 | | | 0.75 | | |
| 27/04/19 09:00 | 13.64 | | | 0.57 | | |
| 27/04/19 12:00 | 14.63 | | | 0.41 | | |
| 27/04/19 15:00 | 14.24 | | | 0.23 | | |
| 27/04/19 18:00 | 15.29 | | | 0.27 | | |
| 27/04/19 21:00 | 15.17 | | | 0.29 | | |
| 28/04/19 00:00 | 15.92 | | | 0.27 | | |

-continued

|  | SWP1 | | | SWP2 | | |
|---|---|---|---|---|---|---|
| DAY/HOUR | Prediction | Sensor data | % of precision | Prediction | Sensor data | % of precision |
| 28/04/19 03:00 | 15.42 | | | 0.30 | | |
| 28/04/19 06:00 | 16.37 | | | 0.39 | | |
| 28/04/19 09:00 | 17.10 | | | 0.32 | | |
| 28/04/19 12:00 | 16.01 | | | 0.36 | | |
| 28/04/19 15:00 | 15.89 | | | 0.37 | | |

Below is the table with the comparison results, after 5 days, between predictions and real values acquired by the sensors.

|  | SWP1 | | | SWP2 | | |
|---|---|---|---|---|---|---|
| DAY/HOUR | Prediction | Sensor data | % of precision | Prediction | Sensor data | % of precision |
| 23/04/19 18:00 | 11.28 | 11.55 | 99.8% | 0.23 | 0 | 99.8% |
| 23/04/19 21:00 | 11.65 | 11.41 | 99.8% | 0.72 | 0 | 99.6% |
| 24/04/19 00:00 | 12.70 | 11.70 | 99.5% | 0.73 | 0 | 99.6% |
| 24/04/19 03:00 | 12.64 | 12.04 | 99.7% | 0.70 | 0 | 99.6% |
| 24/04/19 06:00 | 13.12 | 12.32 | 99.6% | 0.62 | 0 | 99.6% |
| 24/04/19 09:00 | 13.08 | 12.97 | 99.9% | 0.55 | 0.05 | 99.7% |
| 24/04/19 12:00 | 12.36 | 12.84 | 99.7% | 0.33 | 0.67 | 99.8% |
| 24/04/19 15:00 | 12.35 | 12.23 | 99.9% | 0.33 | 0.46 | 99.9% |
| 24/04/19 18:00 | 12.54 | 11.88 | 99.6% | 0.29 | 0.19 | 99.9% |
| 24/04/19 21:00 | 13.34 | 11.76 | 99.2% | 0.57 | 0.41 | 99.9% |
| 25/04/19 00:00 | 13.13 | 12.07 | 99.4% | 0.65 | 0.07 | 99.7% |
| 25/04/19 03:00 | 12.64 | 12.39 | 99.8% | 0.55 | 0 | 99.7% |
| 25/04/19 06:00 | 14.15 | 12.73 | 99.2% | 0.44 | 0 | 99.7% |
| 25/04/19 09:00 | 14.30 | 13.30 | 99.5% | 0.33 | 0.29 | 99.9% |
| 25/04/19 12:00 | 12.93 | 13.27 | 99.8% | 0.37 | 0.91 | 99.7% |
| 25/04/19 15:00 | 12.99 | 12.44 | 99.7% | 0.49 | 0.78 | 99.8% |
| 25/04/19 18:00 | 13.83 | 12.08 | 99.1% | 0.44 | 0.91 | 99.7% |
| 25/04/19 21:00 | 14.02 | 12.04 | 99.0% | 0.62 | 0.59 | 99.9% |
| 26/04/19 00:00 | 13.22 | 12.21 | 99.4% | 0.65 | 0.30 | 99.8% |
| 26/04/19 03:00 | 14.46 | 12.72 | 99.1% | 0.53 | 0.29 | 99.8% |
| 26/04/19 06:00 | 14.50 | 13.09 | 99.2% | 0.44 | 0.15 | 99.8% |
| 26/04/19 09:00 | 13.96 | 13.52 | 99.7% | 0.34 | 0.29 | 99.9% |
| 26/04/19 12:00 | 12.82 | 13.91 | 99.4% | 0.36 | 0.73 | 99.8% |
| 26/04/19 15:00 | 13.62 | 13.64 | 99.9% | 0.21 | 0.61 | 99.8% |
| 26/04/19 18:00 | 14.06 | 13.15 | 99.5% | 0.36 | 0.63 | 99.8% |
| 26/04/19 21:00 | 13.32 | 13.18 | 99.9% | 0.52 | 0.54 | 99.9% |
| 27/04/19 00:00 | 14.66 | 13.56 | 99.4% | 0.76 | 0.19 | 99.7% |
| 27/04/19 03:00 | 14.82 | 14.07 | 99.6% | 0.76 | 0.13 | 99.6% |
| 27/04/19 06:00 | 14.85 | 14.33 | 99.7% | 0.75 | 0.09 | 9.6% |
| 27/04/19 09:00 | 13.64 | 14.77 | 99.4% | 0.57 | 0.58 | 99.9% |
| 27/04/19 12:00 | 14.63 | 14.69 | 99.9% | 0.41 | 0.66 | 99.8% |
| 27/04/19 15:00 | 14.24 | 14.15 | 99.9% | 0.23 | 0.70 | 99.7% |
| 27/04/19 18:00 | 15.29 | 13.72 | 99.2% | 0.27 | 0.75 | 99.7% |
| 27/04/19 21:00 | 15.17 | 13.73 | 99.2% | 0.29 | 0.62 | 99.8% |
| 28/04/19 00:00 | 15.92 | 14.15 | 99.1% | 0.27 | 0.41 | 99.9% |
| 28/04/19 03:00 | 15.42 | 14.55 | 99.5% | 0.30 | 0.32 | 99.9% |
| 28/04/19 06:00 | 16.37 | 14.84 | 99.2% | 0.39 | 0.26 | 99.9% |
| 28/04/19 09:00 | 17.10 | 15.27 | 99.0% | 0.32 | 0.94 | 99.6% |
| 28/04/19 12:00 | 16.01 | 15.15 | 99.5% | 0.36 | 0.72 | 99.8% |
| 28/04/19 15:00 | 15.89 | 14.77 | 99.4% | 0.37 | 1.02 | 99.6% |

The "Scoring" of the Model

According to an aspect of the invention, an automatic scoring process of the model was defined to manage and automate the succession of the learning phases of the same model, to always update it and obtain the greatest possible accuracy. The "score" indicates how accurate the model is: a model with a higher score will be less accurate than a model with a lower score. For example, this process periodically evaluates the accuracy of the predictions produced by the model after the last learning phase, therefore not included in the data set used for learning, updating the corresponding score. This score is the average of the absolute error (MAE) of the predictions compared to the data collected by the sensors in the soil: so the average of the differences is calculated, taken in absolute value, between the values of the quantities resulting from the application of the predictive model and those then actually measured by the sensors in the ground; the score is updated daily using the values measured by the sensors in the soil in the last 24 hours (or other predefined time interval) and recalculating the average with the contribution of absolute differences between these values and the corresponding predicted values. Any other kind of scoring method can be applied within the scope of the present invention.

Thanks to this, whenever the score of a model exceeds a certain threshold, this model can be re-trained using an updated training-set with all the examples present in the database up to that moment.

Below is an example of MAE calculation, applied on the results of the table described in the previous paragraph "Prediction generation" with the results of the comparison, after 5 days, between predictions and real values recorded by the sensors:

| DAY/HOUR | SWP1-Absolute Error | SWP2-Absolute Error |
| --- | --- | --- |
| 23 apr 2019 18:00 | 0.27 | 0.23 |
| 23 apr 2019 21:00 | 0.24 | 0.72 |
| 24 apr 2019 00:00 | 1 | 0.73 |
| 24 apr 2019 03:00 | 0.6 | 0.70 |
| 24 apr 2019 06:00 | 0.8 | 0.62 |
| 24 apr 2019 09:00 | 0.11 | 0.5 |
| 24 apr 2019 12:00 | 0.48 | 0.34 |
| 24 apr 2019 15:00 | 0.12 | 0.13 |
| 24 apr 2019 18:00 | 0.66 | 0.1 |
| 24 apr 2019 21:00 | 1.58 | 0.16 |
| 25 apr 2019 00:00 | 1.06 | 0.58 |
| 25 apr 2019 03:00 | 0.25 | 0.55 |
| 25 apr 2019 06:00 | 1.42 | 0.44 |
| 25 apr 2019 09:00 | 1 | 0.04 |
| 25 apr 2019 12:00 | 0.34 | 0.54 |
| 25 apr 2019 15:00 | 0.55 | 0.29 |
| 25 apr 2019 18:00 | 1.75 | 0.47 |
| 25 apr 2019 21:00 | 1.98 | 0.03 |
| 26 apr 2019 00:00 | 1.01 | 0.35 |
| 26 apr 2019 03:00 | 1.74 | 0.24 |
| 26 apr 2019 06:00 | 1.45 | 0.29 |
| 26 apr 2019 09:00 | 0.44 | 0.05 |
| 26 apr 2019 12:00 | 1.09 | 0.37 |
| 26 apr 2019 15:00 | 0.02 | 0.4 |
| 26 apr 2019 18:00 | 0.91 | 0.27 |
| 26 anr 2019 21.00 | 014 | 002 |
| 27 apr 2019 00:00 | 1.1 | 0.57 |
| 27 apr 2019 03:00 | 0.75 | 0.63 |
| 27 apr 2019 06:00 | 0.52 | 0.66 |
| 27 apr 2019 09:00 | 1.13 | 0.01 |
| 27 apr 2019 12:00 | 0.06 | 0.25 |
| 27 apr 2019 15:00 | 0.09 | 0.47 |
| 27 apr 2019 18:00 | 1.57 | 0.48 |
| 27 apr 2019 21:00 | 1.44 | 0.33 |
| 28 apr 2019 00:00 | 1.77 | 0.14 |
| 28 apr 2019 03:00 | 0.87 | 0.02 |
| 28 apr 2019 06:00 | 1.54 | 0.13 |
| 28 apr 2019 09:00 | 1.83 | 0.62 |
| 28 apr 2019 12:00 | 0.86 | 0.36 |
| 28 apr 2019 15:00 | 1.12 | 0.65 |
| AVERAGE (MAE) | 35.66/40 = 0.9 | 14.48/40 = 0.36 |

Since the aim is to obtain an error of less than 1%, the table above confirms that the model is sufficiently precise and therefore can be used (or continue to be used) for forecasting and therefore for irrigation.

The Irrigation Instructions

According to an aspect of the invention, once the above prediction has been made, the proximity of the SWP values of the sensor-guide is checked (the sensor that acts as a guide is defined in the agronomic tables, see the example of the soybean in FIG. 4). For each phenological phase connected to the root depth, the crop feeds mainly with a part of the root system, so a different depth sensor becomes the indicator of potential criticalities about the water stress threshold indicated for that phenological phase from our agronomic tables. The sensors can be two or more.

If the forecast data does not indicate the achievement of this proximity, the message is "everything OK, no watering necessary in the next 5 days", otherwise it goes on to determine the moment at which the irrigation is necessary and the amount of water to "return" (water to feed to the soil), defined in $m^3/ha$.

The determination of the time to irrigate is carried out considering a threshold of approach to the value of the water stress between 5% and 10%, and, optionally, an advance of at least 12 hours to allow the operator to face any problems (e.g. unavailability of the operator himself, mechanical failure of a plant or agricultural vehicle, etc.).

The definition of the quantity of water to be dispensed is instead determined on the basis of the water behavior model built for the prediction (see paragraph "Model generation"), because it considers the specific reactivity of that soil with that crop in that phenological phase, with the aim of bringing the SWP value back to the range 10-30 of "field capacity" and avoiding both wastage of water and suffering of the crop. This calculation is also influenced by the type of irrigation system, declared by the user in relation to the "zone" treated, because each type of system (e.g. sprinkling, pivot, micro-irrigation, etc.) has a different efficiency in relation to the water supplied.

When a planned irrigation is performed and subsequently confirmed (by the user and/or by the sensor data in the soil), a new prediction is processed which integrates the data of the irrigation, so as to have predictions aligned with this last irrigation intervention.

With this methodology, all calculations and irrigation instructions (which the user can decide to perform manually or to have them performed automatically, by installing an actuator for the remote operation of the pump) derive directly from the values detected in the field, and each water behavior model is specific to the combination soil/geolocation/crop/phenological phase/environmental conditions (both past and forecast), and constitutes a sort of "digital fingerprint" of the crop.

The user has also, optionally, the ability to customize further the treatment of his culture, through some functionality made available by the invention.

According to an aspect of the invention, during the configuration of the "zones", once the crop to be treated and its sowing or transplanting date have been determined, the system makes a copy of the agronomic table of the crop, which from now on will be of exclusive use of that "zone".

The system customization features, described below, affect that copy, which will keep track of user interventions for that "area" in the context that we are going to describe here below, and which then remains as the user's information assets.

In fact, according to an aspect of the invention, the user can intervene with the following actions, individually or together in various ways.

First, there is the possibility of changing the dates of passage from one phenological phase to the next. For example, if the flowering of the corn is expected 6 weeks after sowing, but the user realizes that the environmental conditions rather than the vigor of the seeds used have led to an advance of a few days, he can modify this important date. In this case, the system recalculates the model, to adapt it to the changed conditions and to provide a new, more precise prediction.

Secondly, there is the possibility to edit the irrigation agenda. When an irrigation is recommended, the system enters the information of the date and quantity of water to be dispensed in the so-called "Irrigation agenda". If the user does not modify the application, it is assumed that he will follow the irrigation advice. In this case, the system, in the hours immediately following the recommended irrigation date, verifies that the trend of the SWP values are congruent with the expectation, then confirming the irrigation afterwards or sending an alarm to the user in case of incongruous values. The user can, however, intervene in different ways: by modifying the expected date of irrigation, changing the amount of water, completely canceling the irrigation, or by inserting an irrigation shift even if it was not foreseen (it can happen, for many reasons, because irrigation is also used for purposes other than the crop nurturing, for example in the crop of asparagus during the harvesting phase a light irrigation is often provided to soften the surface of the soil in order to facilitate the sprout of shoots). Any change in the irrigation agenda can lead to a recalculation of the predictions, so that the user can consider the expected effects of his intervention.

Third, the water stress threshold values can be changed. If a user wants to adopt a more "prudent" method of irrigation, he can lower the levels expected for the achievement of the water stress for his crop (or for some of his phenological phases). Doing this it will happen more frequently that the SWP values detected by the soil sensors will approach this threshold (for an example of the water stress threshold see FIG. 5), and therefore a greater number of irrigation interventions will be planned. This functionality can also be used, on the contrary, to decrease the number of irrigation shifts, raising the value of the water stress threshold. This is a method used for some type of crops such as vines, which in some periods must face limited water stress to balance the sugar content and consequently control certain qualities of wine. By artificially raising the threshold of water stress in these periods the effect of forcing this water stress, in the quantity and user-defined duration, is obtained. Each modification of the water stress threshold values advantageously involves a recalculation of the predictions, so that the user can consider the expected effects of his intervention.

Figure 5:
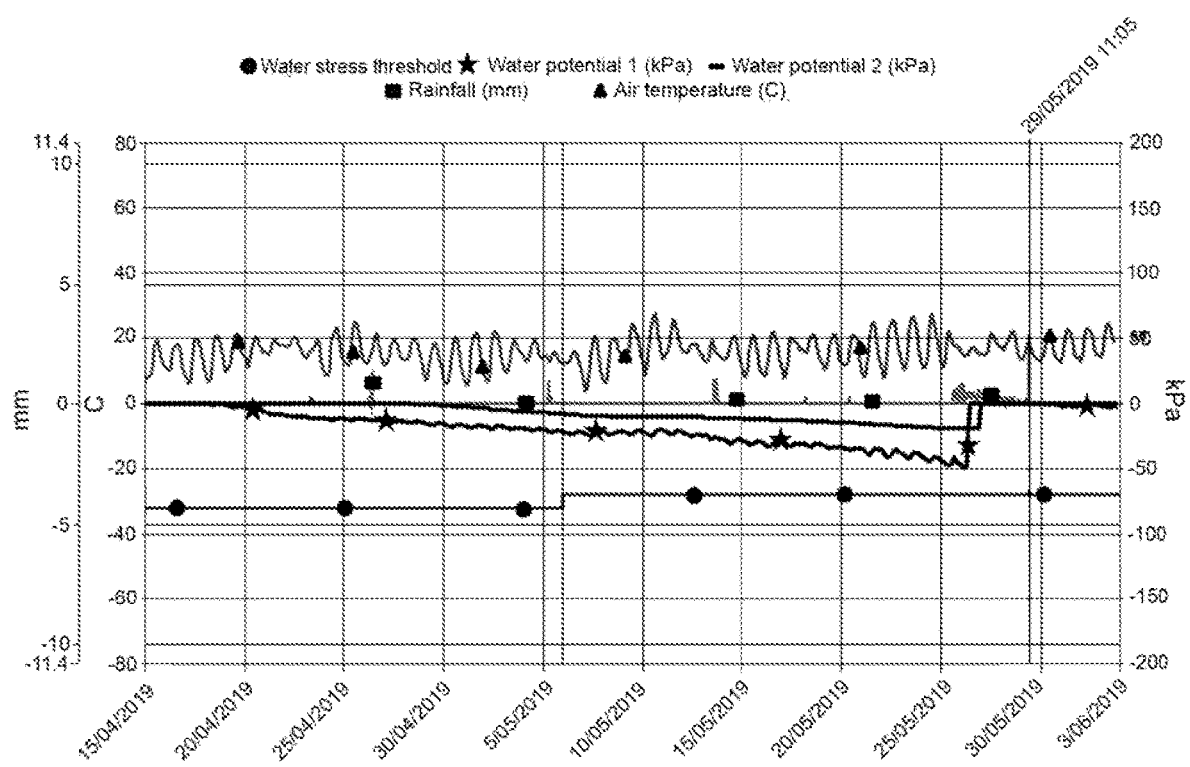
FIG. 5 shows a graph with the trend of the water balance of an asparagus crop, obtained through an embodiment of the method according to the invention.

In this regard, FIG. 5 shows a graph with the trend of the water balance of a crop, including the forecast part. It is an asparagus crop in the open field, in the growth and flowering phase lasting about 3 months. The cultivation was carried out in Villasor in Italy on clay soil using a micro-irrigation system. The altitude is 28 m and the extension of the crop is 1 ha.

In particular, in the graph one can see the vertical line that shows the date and time in which the acquisition is carried out (visible at the head of the vertical line, with the words "Today 29 May 2019 11:05"). All the data on the left of that line are real data, detected by the soil sensors and the weather station, while those on its right are forecast, in part coming from the weather provider (the lines with the square and with the triangle show the rain and the expected temperature), and in part from the predictive elaboration of the invention (the lines with the stars and without symbol indicate the values of the water behavior of the soil in the coming days). Note that in the example, as of May 6, 2019, there is a passage of the specific crop from the "Transplant-Harvest" phenological phase to that of "Growth and flowering". This passage of phenological phase also corresponds to a different level of the water stress threshold of the crop, which goes from a value of 80 Kpa to 70 Kpa, as shown by the horizontal line identified by full dots. To complete the reading of the graph it is possible to see the two lines with the star and without the symbol, which respectively show the SWP values of the sensor positioned at 30 cm of depth and the one placed at 80 cm of depth. In both phenological phases visible in this graph the sensor-guide (the one referred to for the current phenological phase) is the one placed at 80 cm of depth (continuous line without symbol), with values much more stable than the other because the soil at that depth is affected much less by climate change. Neither of the two sensor data lines is significantly close to the light green one which indicates the water stress threshold value, so that no irrigation intervention is required at the time of detection.

According to a further aspect of the method of the invention, the expert algorithm can be configured to give, as one more output, the infiltration time, i.e. the time of water absorption by the soil from the moment of an irrigation event until the relative absorbed water does reach the depth corresponding to the sensor. This time interval is obtained through an interpolation of the SWP data acquired by the relevant sensors, and is identified with the time with which the soil water potential value equals or exceeds the water stress threshold.

Figure 6:
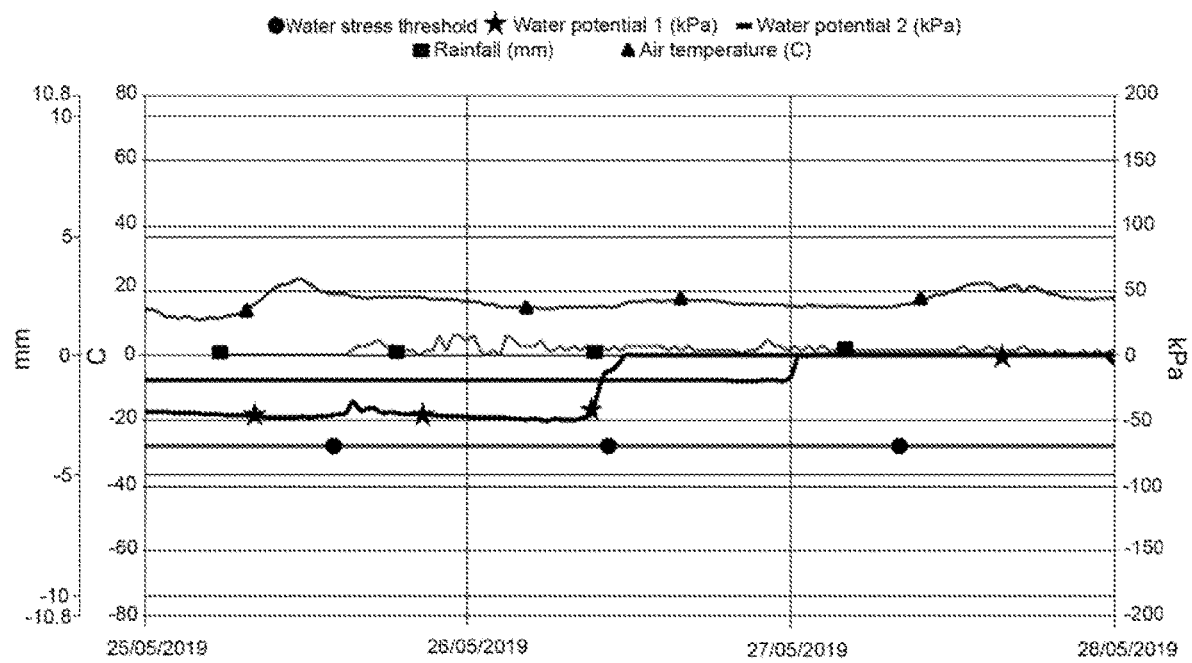
FIG. 6 shows a graph relating to SWP changes during only three days, selected, for consistency, within the time window of FIG. 5: these are the days when, because of the light rains that started on May 25 afternoon, the two SWP sensors show the water behavior "response" of the soil.

With reference to FIG. 6, only three days are shown in the graph, selected for consistency, within the time window of FIG. 5. These are the days when the two SWP sensors show the water response behaviour of the soil because of light rains that started on May 25 afternoon.

In particular, it is noted that the surface sensor (30 cm, highlighted by the line with a star symbol) is naturally the first to react, and already in the late morning of May 26 the SWP values are positioned at zero, i.e. at the field saturation level. In this case it is not easy to "see" the response times of the surface sensor because the rain spread over several hours, while the difference in the water absorption times between the two sensors is quite clear.

The deeper sensor (which in this case is the sensor-guide) is positioned at a depth of 80 cm, so the rainwater must infiltrate further 50 cm to reach it after reaching the surface sensor.

As can be seen, the rise of the SWP values of the sensor-guide (solid line) begins just before midnight on May 26, about 14 hours after the rise of the values of the surface sensor. Compared to the event of rain, the absorption time of the soil up to the sensor-guide at 80 cm is therefore given by the sum of the absorption time of the surface sensor at 30 cm+14 hours.

This additional feature solves a further technical problem, i.e. it makes it unnecessary to have, in the context of irrigation control systems that are not part of the present invention, devices for measuring the events of irrigation that have occurred.

Finally, it is possible to calculate the quantity of irrigation liquid to be dispensed to reach the level of field capacity, remaining above the null soil water potential.

At the level of possible controls when the method according to the invention is repeated several times and it is assumed that the irrigation system is given corresponding commands, the following is possible. In a control phase, if:
 a previous irrigation plan calculated through the steps of this method is available;
 at least one of the deviations between said at least two respective series of predicted water potential values of the soil and said two respective acquired water potential values crosses below a predetermined threshold; and
 a rain event was not detected by the rain sensor in correspondence with the crossing below;
then:
 the occurrence of an irrigation event is determined which is not foreseen by the previous irrigation plan;
 the quantity of water supplied is determined, as follows:
  the starting dates of respective variations of said two respective so water potential values are acquired, above a predefined control threshold, in a suitable predetermined time interval are identified, for each of the aforementioned start dates, a random set of hypothetical irrigations is generated in a predefined time interval before the start date of the change in water potential;

for each irrigation in said random set of possible irrigations, a prediction is made with the trained expert algorithm, using the latest trained expert algorithm available, providing irrigation to the trained expert algorithm, obtaining a set of predictions;

a prediction is selected, in said set of predictions, such that: (a) it has a distance with said two respective water potential values acquired in the present use of the method below a predefined value; and (b) better approximates said two respective water potential values last acquired, minimizing said deviations.

According to an aspect of the invention, during the control phase, after an irrigation event, it is verified that said two respective water potential values correspond to those of the last irrigated instructions created by the method, and, in the negative, the irrigation event is rescheduled and/or an anomaly is reported. The report can go to the user controlling the irrigation system or to the irrigation system itself, which will automatically compensate or warn the user.

These control procedures avoid the use of specific compliance control hardware with respect to the irrigation instructions.

Advantages of the Invention

Among the advantages of the method and system of the present invention there are:

avoidance of all the approximations and estimates contained in the classic agronomic formulas;

definition of a "water behaviour model" of each individual soil and crop without applying general formulas, but by learning it directly from the data collected by the soil sensors and building a specific model for each soil, or better updating it frequently (on average weekly) to follow the trend of the phenological phases of the crop and to catch "live" the effects of climate change;

development of a predictive engine capable of predicting the water behaviour of the land in the next 5 days (the period in which the weather forecast is significantly reliable);

water saving in irrigation avoiding any possible waste, bringing the soil to the "field capacity" (the optimal level of water availability for the crop) without reaching its saturation; and reduction or elimination of all possible additional costs for farmers, such as the chemical analysis of soils (each coring with corresponding chemical analysis has huge costs, it should be done for each field, and it is not realistic to think that these are carried out) or the adoption of local weather stations provided with anemometer (which doubles the cost of the weather station and consumes a lot of electricity, making it necessary to connect to the electricity grid or use much more expensive batteries).

In the foregoing, the preferred embodiments have been described and variants of the present invention have been suggested, but it is to be understood that those skilled in the art will be able to make modifications and changes without thereby departing from the related scope of protection, as defined by the claims attached.

What is claimed is:

1. A method for optimizing soil irrigation in a predetermined crop cultivation area, comprising the following steps:
A) Providing:
A1) at least two water potential sensors installed in said predetermined crop cultivation area at at least two respective depths;
A2) a weather station installed in said predetermined crop cultivation area, with environmental data sensors including: a temperature sensor, a humidity sensor and a rain sensor;
A3) a connection to a remote weather forecast central unit;
A4) a remote irrigation instruction processing central unit connected to said weather station and to said at least two water potential sensors;
A5) configuration data including: position and extension of said predetermined crop cultivation area, type of irrigation system and corresponding flow rate of irrigation fluid, type of said cultivation, sowing date; at least one agronomic table including information on one or more phenological phases of the cultivation and, for each phenological phase: average cultivation root depth, water stress threshold, and indication which one of said at least two water potential sensors in step A1 referred to as a "guide sensor", has soil water potential data to be compared with the water stress threshold;
B) Carrying out the following steps of data acquisition with a first repetition period, storing said data on said remote irrigation instruction processing central unit as time series and associated with a related phenological phase based on said at least one agronomic table;
B1) Acquiring two respective soil water potential values from said at least two water potential sensors;
B2) Acquiring environmental data from said environmental data sensors in the weather station; and
B3) Acquiring weather forecast data from said remote weather forecast central unit, said weather forecast data being geolocated in a position of the weather station;
C) Calculating evapotranspiration on a predetermined future prediction period, with a second repetition period which is greater than or equal to said first repetition period, of a temperature time series acquired in step B2 and the related phenological phase;
D) Training, on said remote irrigation instruction processing central unit, with a third repetition period, an expert algorithm inputting said time series of data stored in step B the related phenological phase, and the evapotranspiration in step C, thus outputting at least two respective series of soil water potential values at said at least two respective depths on said predetermined future prediction period, finally obtaining a trained expert algorithm;
E) Producing, with a third repetition period, by said trained expert algorithm at least two respective series of soil water potential predictive values on said predetermined future prediction period; and
F) Creating, with said third repetition period, an irrigation plan based on said at least two respective series of soil water potential predictive values in step E based on said water stress threshold in step A5, and based on flow rate of the irrigation fluid in said predetermined crop cultivation area.

2. The method of claim 1, wherein step C is carried out based on the temperature time series and a wind data time series, wherein the wind data time series is acquired by a wind sensor included in said environmental data sensors and/or by said remote weather forecast central unit.

3. The method of claim 1 wherein before step E, a step of controlling predictions in steps C and D is carried out, wherein steps C and D are repeated if at least one difference between said at least two respective series of soil water potential predictive values and said two respective soil water potential values acquired in step B1 exceeds a predetermined threshold.

4. The method of claim 3, wherein, in said control step, if:
a previous irrigation plan calculated through steps from A to F is available;
at least one difference between said at least two respective series of soil water potential predictive values and said two respective soil water potential values acquired in step B1 is below the predetermined threshold; and
a rain event was not detected by said rain sensor when said at least one difference is below the predetermined threshold; then:
an irrigation event, not included in said previous irrigation plan, is determined;
and an amount of dispensed water is determined as follows:
start dates of respective variations in said two respective soil water potential values in step B1 are identified, above a predetermined control threshold, in a suitable predetermined time range;
for each start date, a random set of hypothetical irrigations is generated in a predetermined time interval before the start date of water potential variation;
for each irrigation in said random set of hypothetical irrigations, a prediction is made according to step E using a last trained expert algorithm available, providing the last trained expert algorithm with irrigation as an input, thus obtaining a set of predictions;
a prediction is selected from said set of predictions, such that: (a) it has a distance from said two respective soil water potential values acquired in step B1 below a predetermined value; and (b) it best approximates said two respective soil water potential values acquired in step B1, minimizing differences.

5. The method of claim 3, wherein in said control step, after an irrigation event, it is verified that said two respective soil water potential values correspond to those of last irrigation instructions created in step F, and, if not, the irrigation event is rescheduled and/or an anomaly is reported.

6. The method of claim 1, wherein said at least one agronomic table comprises information on soil texture.

7. The method of claim 1, wherein said expert algorithm is configured to further output a time interval with which soil water potential value acquired by said guide sensor equals or exceeds the water stress threshold from a last rain or irrigation event.

8. The method of claim 7, wherein, in step F an amount of irrigation fluid to be dispensed is calculated to reach a field capacity level, remaining above a zero soil water potential.

9. The method of claim 1, wherein said first repetition period is between 1 and three hours, said second repetition period is between 12 and 36 hours, and said third repetition period is between 1 and three weeks.

10. The method of claim 1, wherein said irrigation fluid consists of water.

11. A system for optimizing soil irrigation in a predetermined crop cultivation area, said system comprising:
at least two water potential sensors installed at at least two respective depths in said predetermined crop cultivation area;
an irrigation system for irrigating said predetermined crop cultivation area having a predetermined irrigation fluid flow rate;
a weather station installed in said predetermined crop cultivation area, with environmental data sensors including: a temperature sensor, a humidity sensor and a rain sensor;
a connection to a remote weather forecast central unit;
configuration data including: position and extension of said predetermined crop cultivation area, type of said irrigation system and said predetermined irrigation fluid flow rate, type of said cultivation, sowing date; at least one agronomic table including phenological phases of the cultivation, duration of the phenological phases and, for each phenological phase: average cultivation root depth, water stress threshold, and indication of which one of the at least two water potential sensors has soil water potential data to be compared with the water stress threshold;
a remote irrigation instruction processing central unit connected to said weather station and to said at least two water potential sensors;
wherein, coding means are installed in said remote irrigation instruction processing central unit, configured to carry out steps from B to F of the method of claim 1.

* * * * *